United States Patent
Jie et al.

(10) Patent No.: US 12,367,611 B2
(45) Date of Patent: *Jul. 22, 2025

(54) MICROPHONE DETECTION USING HISTORICAL AND CACHE COORDINATE DATABASES

(71) Applicant: Tencent Technology (Shenzhen) Company Limited, Guangdong (CN)

(72) Inventors: Zequn Jie, Shenzhen (CN); Zheng Ge, Shenzhen (CN); Wei Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,404

(22) Filed: Jan. 11, 2024

(65) Prior Publication Data
US 2024/0153137 A1    May 9, 2024

Related U.S. Application Data

(63) Continuation of application No. 17/377,316, filed on Jul. 15, 2021, now Pat. No. 11,915,447, which is a
(Continued)

(30) Foreign Application Priority Data

Jun. 17, 2019    (CN) .......................... 201910523416.4

(51) Int. Cl.
*G06T 7/73*        (2017.01)
*G06T 7/13*        (2017.01)
(Continued)

(52) U.S. Cl.
CPC .................. *G06T 7/74* (2017.01); *G06T 7/13* (2017.01); *G06T 7/44* (2017.01); *G06T 7/85* (2017.01)

(58) Field of Classification Search
CPC .......... G06N 3/08; G06N 3/02; G06N 3/0464; G06V 10/82; G06V 2201/07;
(Continued)

(56) References Cited

U.S. PATENT DOCUMENTS 6,895,329 B1 *   5/2005   Wolfson ................... G08G 1/20
                                                       701/410
9,729,865 B1 *   8/2017   Kuo ....................... G06F 1/1686
(Continued)

FOREIGN PATENT DOCUMENTS

CN    108230358 A    6/2018
CN    108876858 A    11/2018
(Continued)

OTHER PUBLICATIONS

Extended European Search Report in EP20825730.3, mailed Jun. 28, 2022, 8 pages.
(Continued)

*Primary Examiner* — Henok Shiferaw
*Assistant Examiner* — Woo C Rhim
(74) *Attorney, Agent, or Firm* — ArentFox Schiff LLP

(57) ABSTRACT

An audio acquisition device positioning method is provided. In the method, a first image that includes an audio acquisition device is obtained. The audio acquisition device in the first image is identified. First coordinate data of the identified audio acquisition device in the first image is obtained. First displacement data is determined according to the first coordinate data and historical coordinate data of the audio acquisition device. First coordinates of the audio acquisition device are determined according to the first displacement data.

20 Claims, 8 Drawing Sheets

Related U.S. Application Data continuation of application No. PCT/CN2020/095640, filed on Jun. 11, 2020.

(51) Int. Cl.
*G06T 7/44* (2017.01)
*G06T 7/80* (2017.01)

(58) Field of Classification Search
CPC .. G06V 40/161; G06V 10/764; G06V 40/172; G06V 40/168; G06V 40/16; G06V 40/167; G06V 10/761; G06V 40/10; G06V 40/173; G06V 40/171; G06T 2207/20084; G06T 2207/20081; G06T 2207/10016; G06T 7/73; G06T 7/70; G06T 7/74; G06T 2207/30201; G06T 2207/30196; G06T 7/13; G06T 7/10; G06T 7/246; G06T 7/75; G06T 7/44; G06T 7/85; G06F 16/23; G06F 16/29

See application file for complete search history.

(56) References Cited

U.S. PATENT DOCUMENTS

| | | | |
|---|---|---|---|
| 10,902,263 B1 * | 1/2021 | Angel | A61H 3/061 |
| 2007/0120966 A1 * | 5/2007 | Murai | H04N 7/15 348/E7.083 |
| 2009/0141940 A1 * | 6/2009 | Zhao | G06T 7/248 382/103 |
| 2018/0374233 A1 * | 12/2018 | Zhou | G06F 18/22 |
| 2019/0108647 A1 | 4/2019 | Lee et al. | |
| 2019/0303684 A1 * | 10/2019 | Khadloya | G07C 9/00896 |
| 2019/0313014 A1 * | 10/2019 | Welbourne | G06V 40/70 |
| 2020/0082549 A1 * | 3/2020 | Dehghan | G06V 40/172 |
| 2020/0097615 A1 * | 3/2020 | Song | G06F 16/215 |
| 2020/0143146 A1 * | 5/2020 | Li | G06V 40/165 |
| 2020/0219268 A1 * | 7/2020 | Liu | G06V 10/25 |
| 2020/0265229 A1 * | 8/2020 | Badr | G06T 7/74 |
| 2020/0349382 A1 * | 11/2020 | Chen | G06T 7/246 |
| 2020/0351435 A1 * | 11/2020 | Therkelsen | H04N 7/155 |
| 2022/0180536 A1 * | 6/2022 | Oami | G06V 20/52 |

FOREIGN PATENT DOCUMENTS

| | | | | |
|---|---|---|---|---|
| CN | 109559347 A | | 4/2019 | |
| CN | 109887525 A | | 6/2019 | |
| CN | 110335313 A | | 10/2019 | |
| JP | 5148669 B2 | * | 2/2013 | G01S 11/12 |
| JP | 2017156886 A | * | 9/2017 | |
| JP | 2019066293 A | | 4/2019 | |
| WO | WO-2016183791 A1 | * | 11/2016 | H04N 5/232 |
| WO | WO-2018049957 A1 | * | 3/2018 | G01S 5/22 |
| WO | WO-2020138803 A1 | * | 7/2020 | G06F 16/50 |

OTHER PUBLICATIONS

International Search Report in PCT/CN2020/095640, mailed Sep. 8, 2020, 3 pages.
Kim et al., "Integrated System of Face Recognition and Sound Localization for a Smart Door Phone," IEEE Transactions on Consumer Electronics, Aug. 2013, vol. 59, No. 3, pp. 598-603.
Qian et al., "3D Mouth Tracking from a Compact Microphone Array Co-Located with a Camera," IEEE International Conference on Acoustics, Speech and Signal Processing (ICASSP), Apr. 2018, pp. 3071-3075.
Written Opinion in PCT/CN2020/095640, mailed Sep. 8, 2020, 4 pages.

\* cited by examiner

MICROPHONE DETECTION USING HISTORICAL AND CACHE COORDINATE DATABASES

RELATED APPLICATIONS

This application is a continuation of U.S. application Ser. No. 17/377,316, "AUDIO ACQUISITION DEVICE POSITIONING METHOD AND APPARATUS, AND SPEAKER RECOGNITION METHOD AND SYSTEM" filed on Jul. 15, 2021, which is a continuation of International Application No. PCT/CN2020/095640 filed on Jun. 11, 2020, which claims priority to Chinese Patent Application No. 201910523416.4 filed on Jun. 17, 2019. The entire disclosures of the prior applications are hereby incorporated by reference in their entirety.

FIELD OF THE TECHNOLOGY

This disclosure relates to the field of image processing technologies, including to an audio acquisition device positioning method, an audio acquisition device positioning apparatus, an electronic device, a speaker recognition method, a speaker recognition system, and a computer-readable storage medium.

BACKGROUND OF THE DISCLOSURE

With the rapid development of audio processing technologies, speaker recognition technologies are widely used in various fields of daily life. When speaker recognition is performed, a microphone device generally needs to be accurately positioned.

In solutions provided in the related art, microphone detection is generally performed by using a deep learning-based method, that is, by inputting a to-be-detected image to a deep learning model and using an output result of the deep learning model as a final detection result.

SUMMARY

An embodiment of this disclosure provides an audio acquisition device positioning method. In the method, a first image that includes an audio acquisition device is obtained. The audio acquisition device in the first image is identified. First coordinate data of the identified audio acquisition device in the first image is obtained. First displacement data is determined according to the first coordinate data and historical coordinate data of the audio acquisition device. First coordinates of the audio acquisition device are determined according to the first displacement data.

An embodiment of this disclosure provides an audio acquisition device positioning apparatus, including processing circuitry. The processing circuitry is configured to obtain a first image that includes an audio acquisition device, and identify the audio acquisition device in the first image. The processing circuitry is configured to obtain first coordinate data of the identified audio acquisition device in the first image, and determine first displacement data according to the first coordinate data and historical coordinate data of the audio acquisition device. The processing circuitry is further configured to determine first coordinates of the audio acquisition device according to the first displacement data.

An embodiment of this disclosure provides an electronic device, including: one or more processors; and a storage apparatus, configured to store one or more programs, the one or more programs, when executed by the one or more processors, causing the one or more processors to implement an audio acquisition device positioning method provided in an embodiment of this disclosure, or a speaker recognition method provided in an embodiment of this disclosure.

An embodiment of this disclosure provides a speaker recognition method. In the method, an image is obtained from an image capture device. Face recognition processing is performed on the image to obtain coordinates of at least one face in the image. An audio acquisition device in the image is identified, to obtain coordinates of the audio acquisition device. A distance between the coordinates of the audio acquisition device and coordinates of each of the at least one face is determined, and an object corresponding to coordinates of a face with the smallest distance is determined as a speaker.

An embodiment of this disclosure provides a speaker recognition system, including the audio acquisition device, and an image capture device including an imaging sensor configured to obtain the first image.

An embodiment of this disclosure provides a non-transitory computer-readable storage medium, storing instructions which when executed by a processor, cause the processor to perform the audio acquisition device positioning method or the speaker recognition method.

It is to be understood that, the foregoing general descriptions and the following detailed descriptions are merely for illustration and explanation purposes and are not intended to limit this disclosure.

BRIEF DESCRIPTION OF THE DRAWINGS

The accompanying drawings herein are incorporated in and constitute a part of the disclosure, illustrate embodiments of this disclosure, and are used to explain principles of the embodiments of this disclosure. The accompanying drawings in the following descriptions are merely some embodiments of this disclosure, and a person of ordinary skill in the art may further obtain other accompanying drawings according to the accompanying drawings In the drawings.

DESCRIPTION OF EMBODIMENTS

Figure 1A:
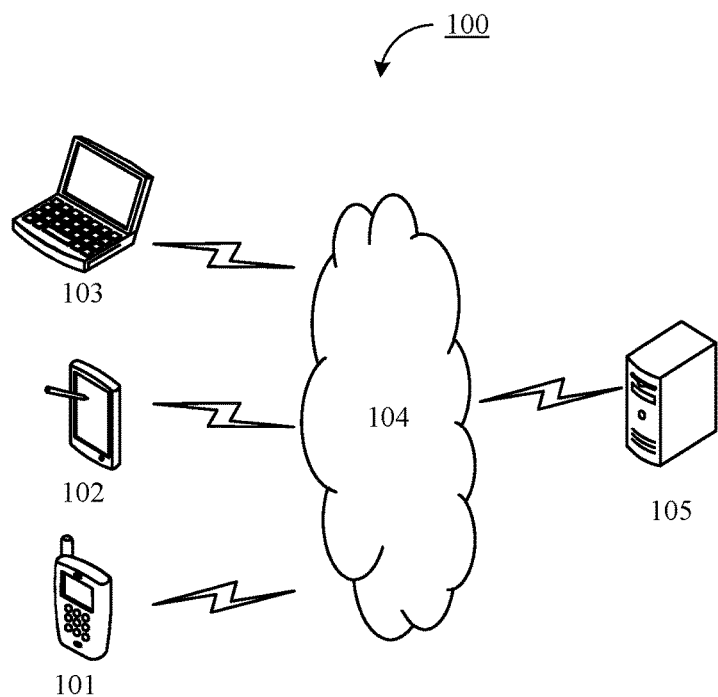
FIG. 1A shows a schematic architectural diagram of an exemplary system to which a technical solution according to an embodiment of this disclosure is applicable.

The exemplary implementations are now described with reference to the accompanying drawings. However, the exemplary implementations can be implemented in various forms and are not construed as being limited to the examples herein. Further, such implementations are provided to make embodiments of this disclosure more clear, and convey the concepts of the exemplary implementations to a person skilled in the art.

In addition, the described features, structures or characteristics may be combined in one or more embodiments in any appropriate manner. In the following descriptions, a lot of specific details are provided to give a comprehensive understanding of the embodiments of this disclosure. However, a person skilled in the art will realize that the technical solution of the embodiments of this disclosure can be practiced without one or more specific details, or other methods, components, devices, steps and the like can be adopted. In other cases, public methods, devices, implementations or operations are not shown or described in detail to avoid blurring aspects of the embodiments of this disclosure.

The block diagrams shown in the accompanying drawing are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples, do not need to include all content and operations/steps, and do not need to be performed in the described orders either. For example, some operations/steps may be further divided, while some operations/steps may be combined or partially combined. Therefore, an actual execution order may change according to an actual case.

In the following description, the term "plurality of" means at least two. In addition, unless otherwise defined, meanings of all technical and scientific terms used in this disclosure are the same as those usually understood by a person skilled in the art to which this disclosure belongs. In this disclosure, terms used in the disclosure are merely intended to describe objectives of the specific embodiments, but are not intended to limit this disclosure.

In recent years, the artificial intelligence (AI) technology has developed rapidly. From conventional machine learning to current deep learning, the AI technology is widely used in many fields. Similarly, deep learning is also widely used in the field of microphone detection. Specifically, a to-be-detected image is inputted to a deep learning model, and an output result of the deep learning model is directly used as a final detection result. However, the solution provided in the related art has at least the following two defects: (1) To make the deep learning model achieve better performance, a large number of labeled samples are needed to train the deep learning model, where both sample collection and labeling can require investment of substantial labor costs and time costs; (2) The accuracy of microphone detection can be low, especially when faced with small target positioning tasks or complex environments, problems such as missed detection, detection position deviation, and false detection are likely to occur, and it is difficult to determine causes of the foregoing abnormalities in the deep learning model.

In view of the problems in the related art, embodiments of this disclosure include an audio acquisition device positioning method, an audio acquisition device positioning apparatus, an electronic device, a speaker recognition method, a speaker recognition system, and a computer-readable storage medium, to rapidly and accurately recognize coordinates of an audio acquisition device, and accurately recognize a speaker. Detailed descriptions are provided below.

FIG. 1A shows a schematic architectural diagram of an exemplary system to which a technical solution according to an embodiment of this disclosure is applicable.

As shown in FIG. 1A, a system architecture 100 may include a terminal device (e.g., a smartphone 101, a tablet computer 102, and a portable computer 103 shown in FIG. 1A), a network 104, and a server 105. The network 104 is configured to provide a medium of a communication link between the terminal device and the server 105. The network 104 may include various connection types, for example, a wired communication link, and a wireless communication link.

It is to be understood that the number of the terminal devices, the number of the network, and the number of the server in FIG. 1A are merely exemplary. There may be any quantities of terminal devices, networks, and servers as required. In some embodiments, the server 105 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The type of the terminal device is not limited to the smartphone, the tablet computer, and the portable computer shown in FIG. 1A, and may alternatively be a desktop computer, a camera, a smart speaker, a smart watch, or the like.

In some embodiments, a user may use the terminal device 101 (or the terminal device 102 or 103) to obtain a to-be-detected image, and then send the to-be-detected image to the server 105; after receiving the to-be-detected image sent from the terminal device 101, the server 105 may perform image recognition on the to-be-detected image, to recognize an audio acquisition device in the to-be-detected image, and obtain first coordinate data of the audio acquisition device; and displacement data is calculated according to the first coordinate data and historical coordinate data of the audio acquisition device, to determine coordinates of the audio acquisition device in the to-be-detected image according to the displacement data. The embodiments of this disclosure, on one hand, can use the image recognition technology used to accurately determine the only audio acquisition device in the to-be-detected image, and avoid the error of a plurality of targets in the to-be-detected image, and on the other hand, can determine the correctness of the first coordinate data with reference to the historical coordinate data and optimize the coordinate data, to further improve the accuracy of the finally determined coordinates of the audio acquisition device.

Figure 1B:
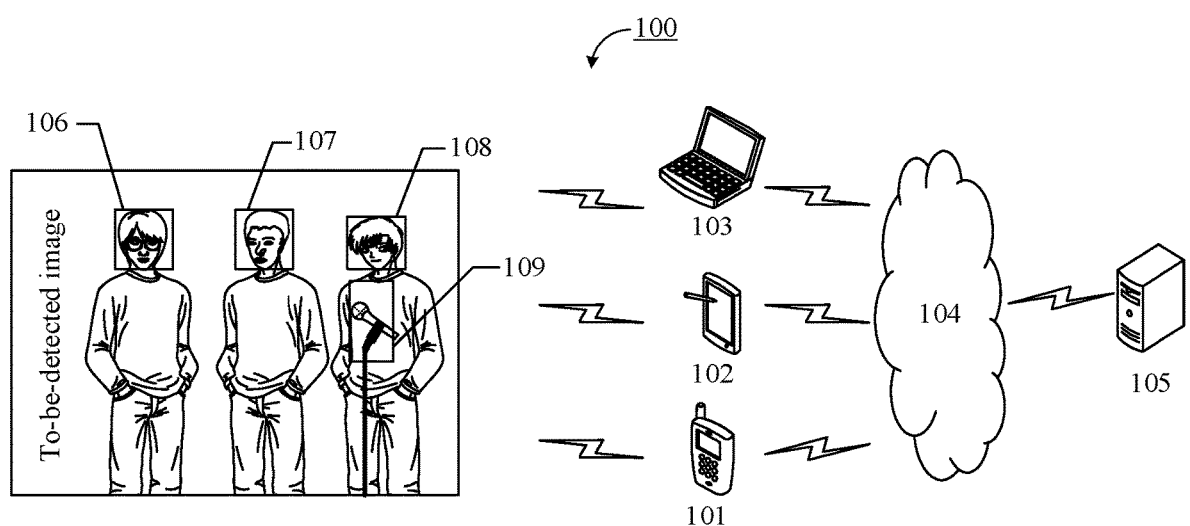
FIG. 1B shows a schematic architectural diagram of an exemplary system to which a technical solution according to an embodiment of this disclosure is applicable.

For ease of understanding, the application of the system architecture 100 is described in an actual scenario. As shown in FIG. 1B, in a multi-person speaking scenario, the terminal device 101 (or the terminal device 102 or 103) may be used to obtain the to-be-detected image. For the to-be-detected image, face targets (e.g., the face targets 106, 107, and 108 shown in FIG. 1B) and an audio acquisition device (e.g., a microphone 109 shown in FIG. 1B) are recognized. Then, distances between coordinates of the audio acquisition device and coordinates of each face target are determined, and a face target object corresponding to coordinates of a face with the smallest distance is determined as a speaker. In FIG. 1B, the face target 108 closest to the microphone 109 is determined as the speaker. After the speaker is determined, a further operation may be performed according to an actual application scenario. For example, in a multi-person video conference, automatic camera following may be performed on a recognized speaker, to enlarge and display an image in the camera on a graphical interface of the terminal device, for example, display the face target 108 on the graphical interface. In addition, after the speaker is recognized, a position of a microphone array may be automatically adjusted, so that the microphone array faces the speaker to acquire clearer speech.

The audio acquisition device positioning method provided in this embodiment of this disclosure may be performed by the server 105, and correspondingly, the audio acquisition device positioning apparatus may be disposed in the server 105. However, in some embodiments, the terminal device may also have functions similar to those of the server, to perform the audio acquisition device positioning method provided in this embodiment of this disclosure. The speaker recognition method provided in this embodiment of this disclosure has the same principle.

Figure 2:
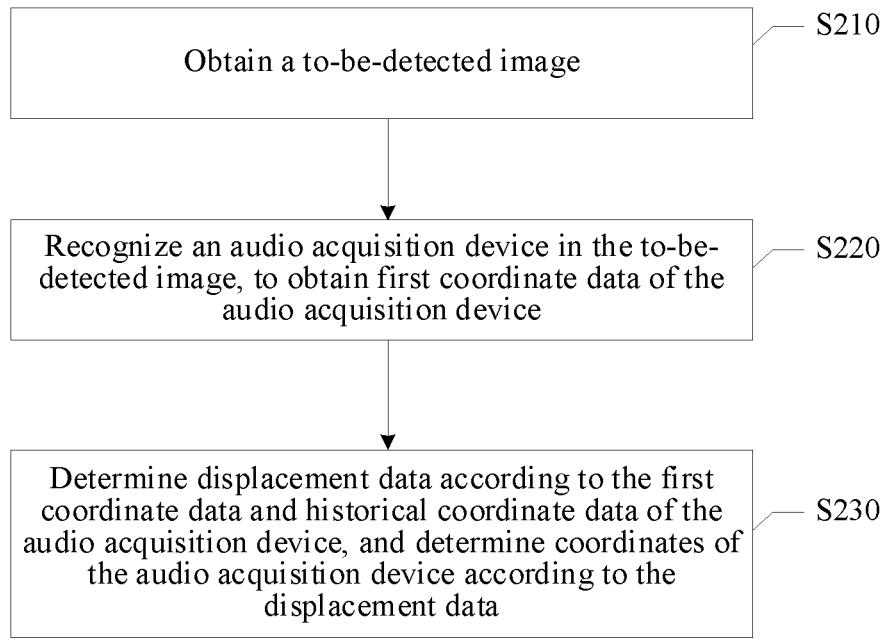
FIG. 2 shows a schematic flowchart of an audio acquisition device positioning method according to an embodiment of this disclosure.

FIG. 2 schematically shows a flowchart of an audio acquisition device positioning method used for microphone recognition according to an embodiment of this disclosure. The positioning method may be performed by a server (e.g., the server 105 shown in FIG. 1A or FIG. 1B), may be performed by a terminal device (e.g., the terminal device 101, 102, or 103 shown in FIG. 1A or FIG. 1B), or may be performed by the terminal device and the server together. Referring to FIG. 2, the audio acquisition device positioning method can include at least steps S210 to S230.

In step S210, a to-be-detected image is obtained.

In some embodiments, the to-be-detected image may be obtained by using the terminal device 101 (or the terminal device 102 or 103). For example, the terminal device 101 may be a device such as a camera or a video recorder, or a picture or a video may be taken by using a photographing unit built in the terminal device 101 or a photographing apparatus externally connected to the terminal device 101, to obtain each frame of the to-be-detected image; or the terminal device 101 may be connected to a data network, to obtain video data or image data by browsing and downloading network resources or local database resources, to further obtain each frame of the to-be-detected image. A specific manner for obtaining the to-be-detected image is not limited in this embodiment of this disclosure.

In step S220, an audio acquisition device in the to-be-detected image is recognized, to obtain first coordinate data of the audio acquisition device.

In some embodiments, the audio acquisition device may be a microphone, or an audio acquisition device with audio acquisition and audio amplification functions such as a mobile phone in each frame of the to-be-detected image. In embodiments of this disclosure, the audio acquisition device being a microphone is used for illustration. In this embodiment of this disclosure, after the to-be-detected image is obtained, feature extraction may be performed on the to-be-detected image by using a pre-trained target recognition model, and then the audio acquisition device may be recognized and positioned according to extracted feature information, to further obtain coordinate data of the audio acquisition device as the first coordinate data. In this embodiment of this disclosure, the to-be-detected image may be inputted to the target recognition model, to recognize the to-be-detected image. The target recognition model may be a machine learning model, for example, may be a convolutional neural network (CNN) model, a recurrent neural network (RNN) model, a faster region-convolutional neural network (Faster RCNN) model, or the like. This is not specifically limited in this embodiment of this disclosure.

Figure 3:
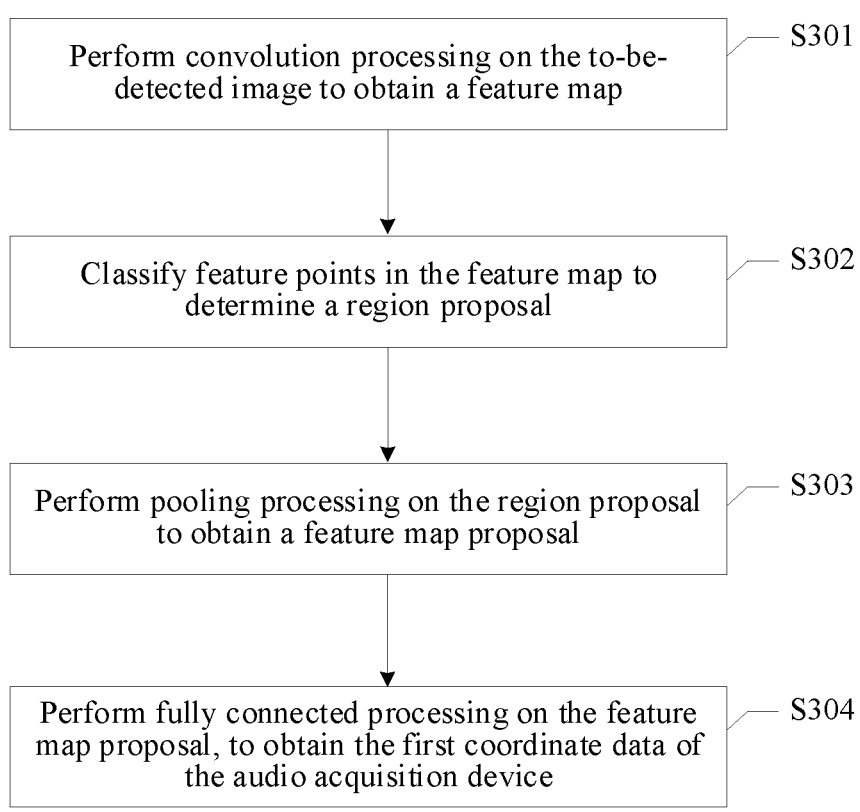
FIG. 3 shows a schematic flowchart of recognizing a to-be-detected image according to an embodiment of this disclosure.

In some embodiments, FIG. 3 shows a schematic flowchart of recognizing a to-be-detected image by using a target recognition model. A Faster RCNN-based target recognition model is used as an example, as shown in FIG. 3.

In step S301, convolution processing is performed on a to-be-detected image to obtain a feature map. The to-be-detected image that is inputted in the model may be a picture of any size, and the feature map of the to-be-detected image is extracted by using a convolutional layer. In step S302, feature points in the feature map are classified to determine a region proposal. A region proposal network (RPN) is mainly used to generate a region proposal. A specified quantity of anchor boxes may be generated on the foregoing obtained feature map. Whether the anchors belong to the foreground or the background may be determined, and the anchor boxes are corrected at the same time, to obtain a relatively accurate region proposal. In step S303, pooling processing is performed on the region proposal to obtain a feature map proposal. A fixed-size feature map proposal is obtained by using the region proposal and the feature map generated by the RPN. In step S304, fully connected processing is performed on the feature map proposal, to obtain first coordinate data of an audio acquisition device. The fully connected processing is performed on the fixed-size feature map proposal formed in a pooling layer, and a specific category is classified, and meanwhile, regression operation is performed, to obtain the first coordinate data of the audio acquisition device in the to-be-detected image.

Figure 4:
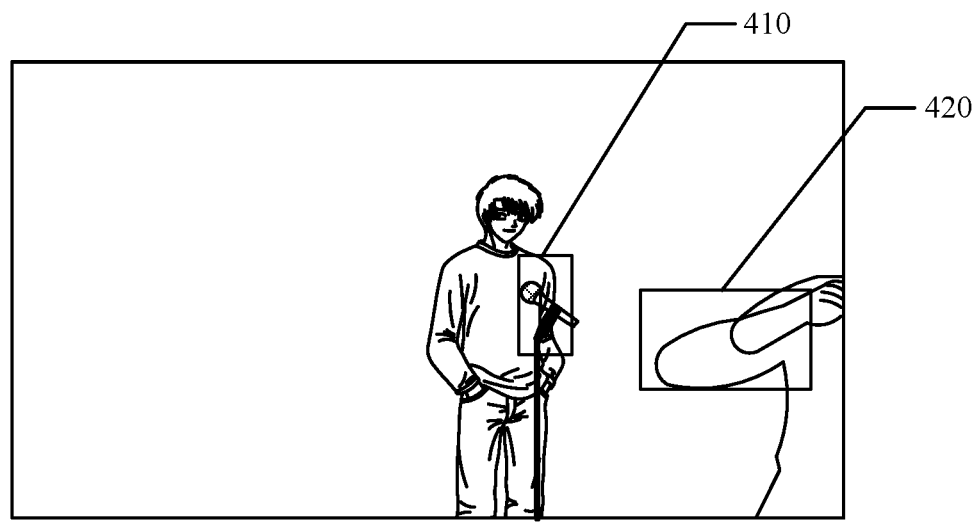
FIG. 4 shows a schematic diagram of a detection result of a to-be-detected image according to an embodiment of this disclosure.

In some embodiments, after the to-be-detected image is inputted to the target recognition model for the recognition operation of the audio acquisition device, the target recognition model may return a microphone coordinate data (the microphone coordinate data is coordinate data corresponding to a recognition target), or a plurality of microphone coordinate data. The microphone coordinate data may be center coordinates corresponding to a center position of a recognized microphone target (the microphone target corresponds to the recognition target). For example, a frame of to-be-detected image as shown in FIG. 4 includes two recognition results: a recognition frame 410 and a recognition frame 420. Two microphone targets are recognized in this frame of the to-be-detected image. The microphone target corresponding to the recognition frame 410 is correct, and the microphone target corresponding to the recognition frame 420 is incorrect, that is, a human arm is mistakenly recognized as the microphone target.

Figure 5:
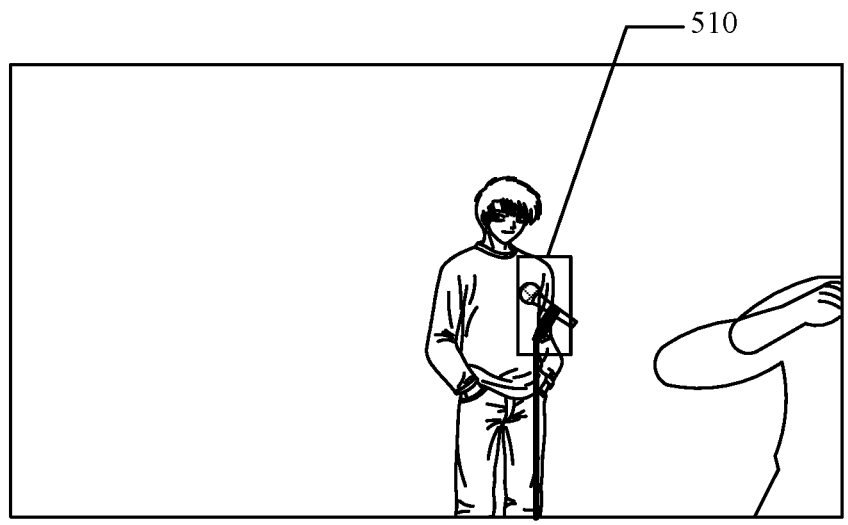
FIG. 5 shows a schematic diagram of a detection result obtained after edge detection is performed on a to-be-detected image according to an embodiment of this disclosure.

In this embodiment of this disclosure, edge detection may be performed on the to-be-detected image, to recognize a support apparatus configured to support the microphone targets in the to-be-detected image, thereby eliminating false detection of the support apparatus. The support apparatus may be a microphone support. For example, after edge detection is performed on the to-be-detected image as shown in FIG. 4, a detection result shown in FIG. 5 may be obtained. In FIG. 5, only one recognition frame 510 is included, and coordinate data corresponding to the recognition frame 510 is first coordinate data.

Figure 6A:
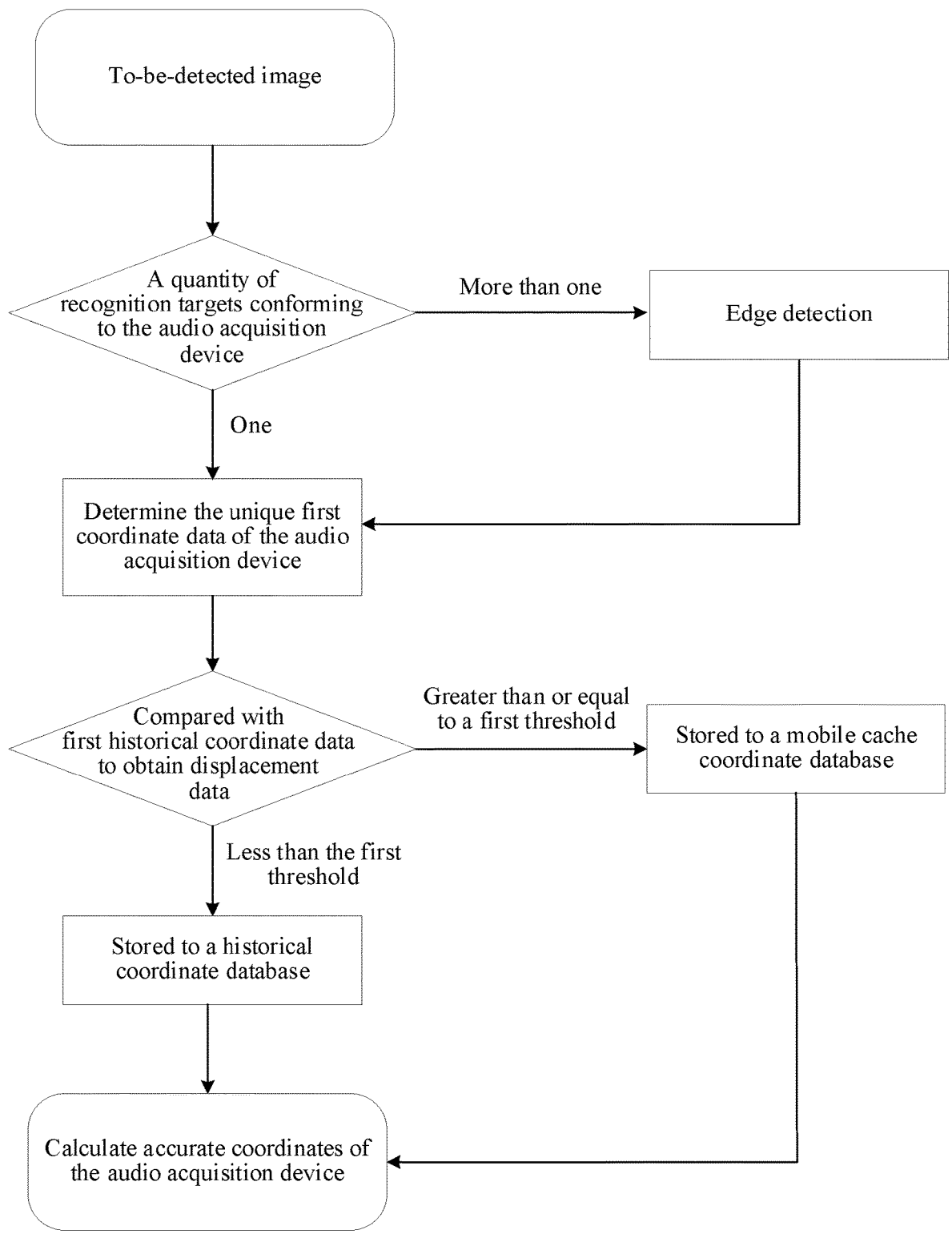
FIG. 6A shows a schematic flowchart of an audio acquisition device positioning method according to an embodiment of this disclosure.

This embodiment of this disclosure provides a flowchart as shown in FIG. 6A. The audio acquisition device being a microphone is used as an example. After a plurality of microphone targets conforming to the microphone are recognized in the to-be-detected image, edge detection is performed on the to-be-detected image, and edge information in the to-be-detected image is extracted. The microphone support is an edge, and thus may be detected. Then, it is determined whether the edge information of the microphone support is detected under the recognized plurality of microphone targets, to determine a microphone target with the microphone support disposed therebelow as the only correct microphone.

Figure 6B:
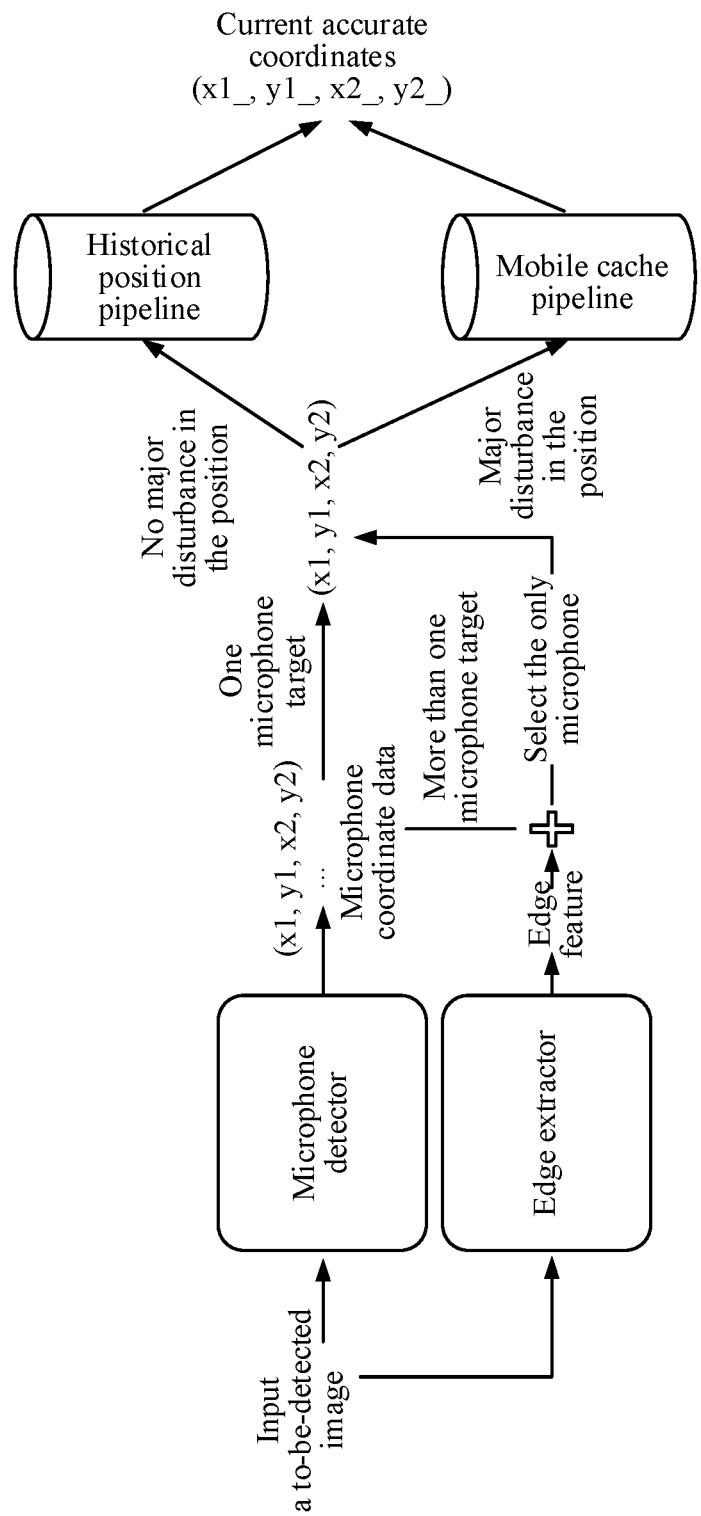
FIG. 6B shows a schematic flowchart of an audio acquisition device positioning method according to an embodiment of this disclosure.

This embodiment of this disclosure further provides a flowchart as shown in FIG. 6B. Also, the audio acquisition device being a microphone is used as an example. After the to-be-detected image is obtained, microphone coordinate data in the to-be-detected image is detected by using a microphone detector, and meanwhile, an edge feature in the to-be-detected image is extracted by using an edge extractor, where the microphone detector is the target recognition model, the process of extracting the edge feature is edge detection, and the edge feature is the edge information. If microphone coordinate data of only one microphone target is obtained, the microphone coordinate data is used as the first coordinate data; and if microphone coordinate data of a plurality of microphone targets are obtained, a microphone target with the microphone support disposed therebelow is determined as the only correct microphone by using the obtained edge feature.

In step S230, displacement data is determined according to the first coordinate data and historical coordinate data of the audio acquisition device, and coordinates of the audio acquisition device are determined according to the displacement data.

In some embodiments, a historical coordinate database and a mobile cache coordinate database may be pre-configured. The historical coordinate database may be configured to store coordinates of the audio acquisition device in each historical frame of the to-be-detected image, that is, all position records of the microphone before an "actual movement" occurs. All position records. The mobile cache coordinate database may be configured to store mobile cache coordinate data corresponding to the recognition target in the current to-be-detected image, and a position record of the microphone "possible to move".

In some embodiments, after the unique first coordinate data of the audio acquisition device is obtained, the first coordinate data may be accurately corrected.

For example, if the current to-be-detected image is an $n^{th}$ frame of the to-be-detected image, accurate coordinates of the audio acquisition device in a preceding $m^{th}$ frame, an $(m+1)^{th}$ frame, . . . , and an $(n-1)^{th}$ frame of the to-be-detected image, that is, a total of n-m frames of the to-be-detected image may be stored in the historical coordinate database as historical coordinate data, where n and m are both positive integers, and n>m. In this embodiment of this disclosure, the displacement data may be calculated according to the first coordinate data and the historical coordinate data of the audio acquisition device. First, weighted average processing is performed on all the historical coordinate data in the historical coordinate database to obtain the first historical coordinate data. Then, the first coordinate data of the audio acquisition device in the to-be-detected image is compared with the first historical coordinate data to obtain the displacement data. For example, differences between the first coordinate data and the first historical coordinate data on the horizontal axis and the vertical axis may be calculated in the same coordinate system to obtain the displacement data.

In some embodiments, when the current to-be-detected image is the $n^{th}$ frame of the to-be-detected image, after the displacement data is obtained, the displacement data may be compared with a preset first threshold. As shown in FIG. 6A, first, when the displacement data is less than the first threshold, the first coordinate data of the audio acquisition device in the to-be-detected image is saved to the historical coordinate database as new historical coordinate data in the historical coordinate database. Then, weighted average processing is performed on all the historical coordinate data in the updated historical coordinate database, to obtain second coordinate data, and the second coordinate data is used as accurate coordinates of the audio acquisition device in the $n^{th}$ frame of the to-be-detected image. Meanwhile, the mobile cache coordinate database may be cleared.

For example, when the displacement data is less than the first threshold, it indicates that the position of the microphone in the $n^{th}$ frame of the to-be-detected image is close to a historical position. For example, when coordinate differences between the first coordinate data and the first historical coordinate data on the horizontal axis and the vertical axis are both less than 50 pixels, it is considered that the microphone is not moved. As shown in FIG. 6B, it is considered that there is no major disturbance in the position of the microphone, and first coordinate data (x1, y1, x2, y2) is saved to the historical coordinate database (historical position pipeline), to update the historical coordinate database, where x represents a value on the horizontal axis, y represents a value on the vertical axis, and (x1, y1, x2, y2) is the form of the corresponding recognition frame. Then, weighted average processing is performed on all the historical coordinate data in the updated historical coordinate database, and a processing result is used as accurate coordinates of the audio acquisition device in the $n^{th}$ frame of the to-be-detected image, as (x1_, y1_, x2_, y2_) shown in FIG. 6B. Meanwhile, the mobile cache database may be cleared, and the mobile cache coordinate data may be deleted.

In some embodiments, if the current to-be-detected image is the $n^{th}$ frame of the to-be-detected image, the displacement data is compared with the preset first threshold. As shown in FIG. 6A, when the displacement data corresponding to the $n^{th}$ frame of the to-be-detected image is greater than or equal to the first threshold, it indicates that the position of the audio acquisition device in the $n^{th}$ frame of the to-be-detected image deviates greatly from the historical position, and the audio acquisition device in the $n^{th}$ frame of the to-be-detected image is "possible to move" (e.g., the "major disturbance in the position" in FIG. 6B). In this case, the first coordinate data of the $n^{th}$ frame of the to-be-detected image is saved to the mobile cache coordinate database (a mobile cache pipeline in FIG. 6B) as the mobile cache coordinate data in the mobile cache coordinate database. Meanwhile, the first historical coordinate data may be configured as the accurate coordinates of the audio acquisition device in the $n^{th}$ frame of the to-be-detected image, to ensure the continuity of target recognition of the to-be-detected image, as the accurate coordinates (x1_, y1_, x2_, y2_) shown in FIG. 6B. The displacement data is greater than or equal to the first threshold, which may be that the coordinate difference between the first coordinate data and the first historical coordinate data on the horizontal axis is greater than or equal to 50 pixels, may be that the coordinate difference on the vertical axis is greater than or equal to 50 pixels, or may be that the coordinate differences on the horizontal axis and the vertical axis are both greater than or equal to 50 pixels.

Then, an $(n+1)^{th}$ frame of the to-be-detected image may be obtained, first coordinate data of the audio acquisition device in the $(n+1)^{th}$ frame of the to-be-detected image is determined, the first coordinate data is compared with the mobile cache coordinate data, and whether the first coordinate data needs to be compared with the first historical coordinate data is determined according to the result of the comparison, thereby determining the correctness of the mobile cache coordinate data, and determining accurate coordinates of the audio acquisition device in the $(n+1)^{th}$ frame of the to-be-detected image.

In some embodiments, the first coordinate data in the $(n+1)^{th}$ frame of the to-be-detected image is compared with the mobile cache coordinate data. For example, position deviation data between the first coordinate data in the $(n+1)^{th}$ frame of the to-be-detected image and the mobile cache coordinate data is calculated, and the position deviation data is compared with a second threshold. When the position deviation data is less than the second threshold, the historical coordinate database is cleared, and the mobile cache coordinate data in the mobile cache coordinate database and the first coordinate data in the $(n+1)^{th}$ frame of to-be-detected image are saved to the historical coordinate database as historical coordinate data in the historical coordinate database. Then, weighted average processing is performed on all the historical coordinate data in the updated historical coordinate database, to obtain third coordinate data, and the third coordinate data is used as accurate coordinates of the audio acquisition device in the $(n+1)^{th}$ frame of the to-be-detected image.

When the position deviation data is less than the preset second threshold, for example, when in the same coordinate system, coordinate differences between the first coordinate data in the $(n+1)^{th}$ frame of the to-be-detected image and the mobile cache coordinate data on the horizontal axis and the vertical axis are both less than 50 pixels, it indicates that the position of the audio acquisition device in the $(n+1)^{th}$ frame of the to-be-detected image is close to the position of the audio acquisition device in the $n^{th}$ frame of the to-be-detected image, and it is considered that an "actual movement" occurs in the $n^{th}$ frame. Then, the historical coordinate database may be cleared, and the first coordinate data in the $(n+1)^{th}$ frame of the to-be-detected image and the mobile cache coordinate data are saved to the historical coordinate database, to complete the update of the historical coordinate database. In this case, the first coordinate data of the audio acquisition device in the $n^{th}$ frame of the to-be-detected image and the $(n+1)^{th}$ frame of the to-be-detected image are saved in the historical coordinate database. Then, weighted average processing may be performed on all the historical coordinate data in the updated historical coordinate database, and a processing result is used as accurate coordinates of the audio acquisition device in the $(n+1)^{th}$ frame of the to-be-detected image.

In some embodiments, the first coordinate data in the $(n+1)^{th}$ frame of the to-be-detected image is compared with the mobile cache coordinate data. For example, position deviation data between the first coordinate data in the $(n+1)^{th}$ frame of the to-be-detected image and the mobile cache coordinate data is calculated, and the position deviation data is compared with a second threshold. When the position deviation data is greater than or equal to the second threshold, the first coordinate data in the $(n+1)^{th}$ frame of to-be-detected image is compared with the first historical coordinate data, to calculate displacement data. When the displacement data is less than the first threshold, the first coordinate data in the $(n+1)^{th}$ frame of to-be-detected image is saved to the historical coordinate database as new historical coordinate data in the historical coordinate database. Weighted average processing is performed on all the historical coordinate data in the updated historical coordinate database, to obtain fourth coordinate data, and the fourth coordinate data is used as accurate coordinates of the audio acquisition device in the $(n+1)^{th}$ frame of the to-be-detected image. Meanwhile, the mobile cache coordinate database is cleared.

When the position deviation data is greater than or equal to the preset second threshold, for example, when in the same coordinate system, a coordinate difference between the first coordinate data in the $(n+1)^{th}$ frame of the to-be-detected image and the mobile cache coordinate data on the horizontal axis is greater than or equal to 50 pixels, or a coordinate difference on the vertical axis is greater than or equal to 50 pixels, or the coordinate differences on the horizontal axis and the vertical axis are both greater than or equal to 50 pixels, the displacement data between the first coordinate data in the $(n+1)^{th}$ frame of to-be-detected image and the first historical coordinate data is calculated. If the displacement data is less than the preset first threshold, it indicates that the first coordinate data in the (n+1)th frame of to-be-detected image is close to the historical coordinate data in the historical coordinate database, and disturbance occurs in the $n^{th}$ frame of to-be-detected image. Then, the first coordinate data in the $(n+1)^{th}$ frame of to-be-detected image may be saved to the historical coordinate database, the historical coordinate database may be updated, and the mobile cache coordinate database may be cleared. Then, weighted average processing is performed on all the historical coordinate data in the updated historical coordinate database, and a processing result is used as accurate coordinates of the audio acquisition device in the $(n+1)^{th}$ frame of the to-be-detected image.

In some embodiments, the first coordinate data corresponding to the $n^{th}$ frame of the to-be-detected image is compared with the first historical coordinate data, and when the obtained displacement data is greater than or equal to the first threshold, the first coordinate data in the $(n+1)^{th}$ frame of to-be-detected image may be further compared with the first historical coordinate data. If the obtained displacement data is less than the first threshold, it indicates that disturbance occurs in the $n^{th}$ frame of the to-be-detected image. Then the first coordinate data of the $(n+1)^{th}$ frame of to-be-detected image is saved to the historical coordinate database, weighted average processing is performed on all the historical coordinate data in the updated historical coordinate database, and a processing result is used as accurate coordinates of the audio acquisition device in the $(n+1)^{th}$ frame of the to-be-detected image.

Otherwise, after the first coordinate data in the $(n+1)^{th}$ frame of to-be-detected image is compared with the first historical coordinate data, if the obtained displacement data is greater than or equal to the first threshold, the position deviation data between the first coordinate data in the $(n+1)^{th}$ frame of to-be-detected image and the mobile cache coordinate data is determined. When the position deviation data is less than the second threshold, the historical coordinate database is cleared, and the mobile cache coordinate data and the first coordinate data in the $(n+1)^{th}$ frame of to-be-detected image are saved to the historical coordinate database as historical coordinate data in the historical coordinate database. Then, weighted average processing is performed on all the historical coordinate data in the updated historical coordinate database, and a processing result is used as coordinates of the audio acquisition device in the $(n+1)^{th}$ frame of the to-be-detected image.

Figure 6C:
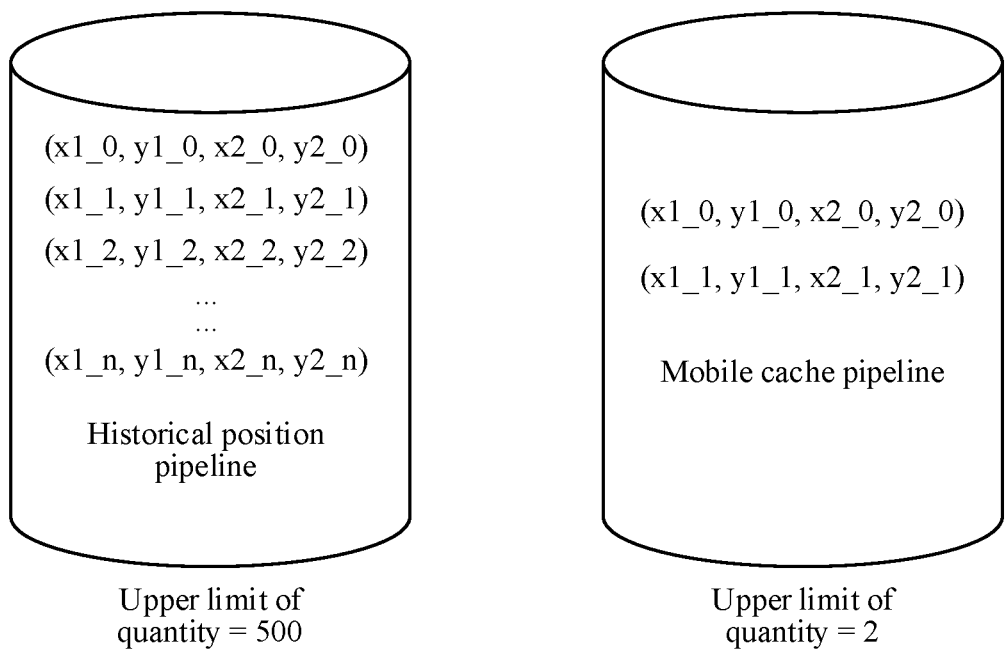
FIG. 6C shows a schematic diagram of a historical coordinate database and a mobile cache coordinate database according to an embodiment of this disclosure.

In some embodiments, data capacities of the historical coordinate database and the mobile cache coordinate database may be further configured. For example, as shown in FIG. 6C, the historical coordinate database (historical position pipeline) is configured to store up to 300 or 500 historical coordinate data. The historical coordinate data is, for example, (x1_0, y1_0, x2_0, y2_0) in the historical position pipeline shown in FIG. 6C. When a quantity of historical coordinate data in the historical coordinate database reaches an upper limit, if there is new coordinate data that needs to be saved in the historical coordinate database, one or more historical coordinate data that are ranked higher may be deleted, such as the first 10, 50, or 100 historical coordinate data, or the historical coordinate database may be cleared according to a specified time period, so that coordinate data may be normally stored in the historical coordinate database. The mobile cache coordinate database (mobile cache pipeline), as shown in FIG. 6C, may be configured to store up to 2 or 3 mobile cache coordinate data, to rapidly and accurately process each frame of disturbed to-be-detected image, and avoid large errors or mistakes in the subsequent calculation of the coordinates of the audio acquisition device in the to-be-detected image due to the accumulation of the mobile cache coordinate data. For example, FIG. 6C shows mobile cache coordinate data (x1_0, y1_0, x2_0, y2_0) in the mobile cache pipeline.

In some embodiments, when the audio acquisition device is not recognized in the current frame of the to-be-detected image, to ensure the continuity of target recognition on the to-be-detected image, weighted average processing may be performed on all the historical coordinate data in the updated historical coordinate database, to obtain fifth coordinate data, and the fifth coordinate data is used as accurate coordinates of the audio acquisition device in the to-be-detected image.

In some embodiments, when the audio acquisition device is not recognized in k consecutive frames of the to-be-detected image and k is less than a third threshold, weighted average processing is performed on all the historical coordinate data in the updated historical coordinate database, to obtain fifth coordinate data, and the fifth coordinate data is used as accurate coordinates of the audio acquisition device in the to-be-detected image, k being a positive integer. In some embodiments, when the audio acquisition device is not recognized in two or three consecutive frames of the to-be-detected image, weighted average processing is performed on all the historical coordinate data in the updated historical coordinate database, to obtain fifth coordinate data, and the fifth coordinate data is used as accurate coordinates of the audio acquisition device in the two or three consecutive frames of the to-be-detected image.

In some embodiments, when the audio acquisition device is not recognized in j consecutive frames of the to-be-detected image and j is greater than or equal to a third threshold, alarm information indicating that the audio acquisition device does not exist in the to-be-detected image is generated, j being a positive integer. For example, if the audio acquisition device is not recognized in five or six consecutive frames of the to-be-detected image, it is considered that there is no audio acquisition device in the to-be-detected image, and then the alarm information may be issued to prompt the user, and the target positioning of the to-be-detected image is temporarily terminated.

The audio acquisition device positioning method in this embodiment of this disclosure may be applied to a product such as speaker recognition, and is configured for real-time detection and positioning of a microphone device or another audio acquisition device in the environment. The audio acquisition device positioning method may be further applied to another scenario in which a specific target needs to be recognized.

According to the audio acquisition device positioning method in this embodiment of this disclosure, after the unique first coordinate data of the audio acquisition device is determined by using the image recognition technology, the first coordinate data may be judged and confirmed with reference to the historical coordinate data of the audio acquisition device, thereby improving the accuracy of the obtained coordinates of the audio acquisition device, and avoiding missed detection, false detection or position deviation.

Figure 7:
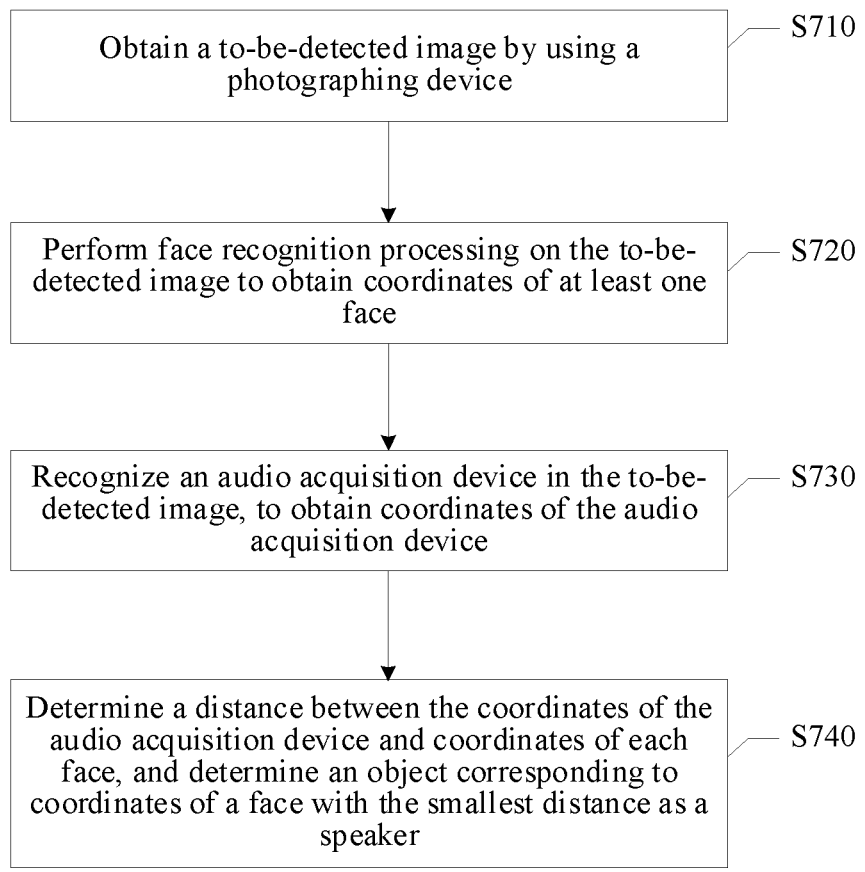
FIG. 7 shows a schematic flowchart of a speaker recognition method according to an embodiment of this disclosure.

FIG. 7 schematically shows a flowchart of a speaker recognition method according to an embodiment of this disclosure. The recognition method may be performed by a server, such as the server shown in FIG. 1A or FIG. 1B; the recognition method may be alternatively performed by a terminal device, such as the terminal device shown in FIG. 1A or FIG. 1B; or the recognition method may be performed by the terminal device and the server together. Referring to FIG. 7, the speaker recognition method can include at least steps S710 to S740.

In step S710, a to-be-detected image is obtained by using an image capture device, such as a photographing device.

In some embodiments, a to-be-detected image may be obtained by using a photographing device. For example, the photographing device may be a device such as a video camera, a digital camera, or a monitor, or may be a device such as a photographing unit built in the terminal device or a photographing unit externally connected to the terminal device. The photographing device is used to take a picture or a video of an environment containing an audio acquisition device (e.g., a microphone), to further obtain each frame of the to-be-detected image.

In step S720, face recognition processing is performed on the to-be-detected image to obtain coordinates of at least one face.

Figure 8:
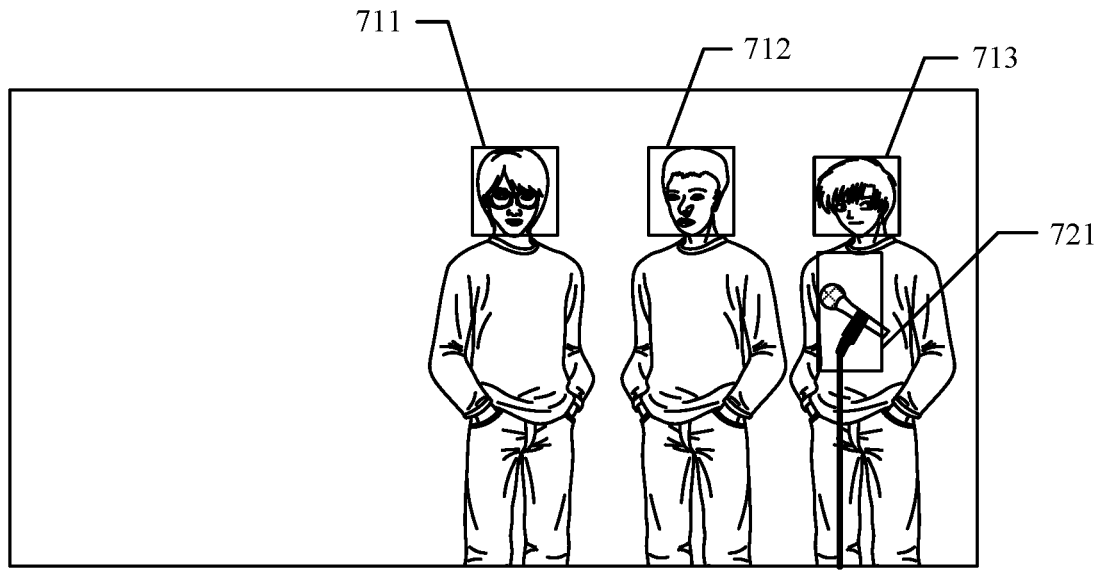
FIG. 8 shows a schematic diagram of a detection result including a face recognition result and an audio acquisition device recognition result according to an embodiment of this disclosure.

In some embodiments, after the to-be-detected image is obtained, a face recognition model may be used to perform face recognition on the to-be-detected image, to obtain one or more face targets in the to-be-detected image, and coordinates of a center point of each face target are used as respective face coordinates. For example, in a frame of to-be-detected image corresponding to the scenario shown in FIG. 8, after face recognition, it is determined that the current frame of the to-be-detected image contains three face targets (a target 711, a target 712, and a target 713), and coordinates of a center point of each face target are used as face coordinates of each face target in the current frame of the to-be-detected image.

In step S730, an audio acquisition device in the to-be-detected image is recognized, to obtain coordinates of the audio acquisition device.

In some embodiments, while face recognition is performed on the to-be-detected image, an audio acquisition device (e.g., a microphone) in the to-be-detected image may be further recognized by using the foregoing audio acquisition device positioning method, to obtain accurate coordinates of the audio acquisition device in the current frame of the to-be-detected image. For example, the scenario shown in FIG. 8 includes a microphone device 721, and coordinates of a center point of the microphone device 721 may be used as accurate coordinates of the microphone. The detailed process of recognizing the to-be-detected image to obtain the accurate coordinates of the audio acquisition device in the to-be-detected image is described in detail in the foregoing embodiment, and details are not repeated herein.

In step S740, a distance between the coordinates of the audio acquisition device and coordinates of each face is determined, and an object corresponding to coordinates of a face with the smallest distance is determined as a speaker.

In some embodiments, after the accurate coordinates of the microphone device in the current frame and the face coordinates are obtained, the distance between the coordinates of the audio acquisition device (e.g., a microphone) and the coordinates of each face may be calculated, and the object corresponding to the coordinates of the face with the smallest distance is determined as the speaker. For example, in the scenario shown in FIG. 8, after calculation, a distance between the microphone device 721 and the face target 713 is the smallest, and then an object corresponding to the face target 713 may be determined as the speaker.

According to the speaker recognition method in this embodiment of this disclosure, the microphone and the faces in the to-be-detected image may be recognized and positioned, and the positional relationship between the microphone and each face in the image may be determined, to effectively assist in the positioning of the speaker from the visual perspective.

The following describes an audio acquisition device positioning apparatus provided in this embodiment of this disclosure, which may be configured to perform the audio acquisition device positioning method provided in this embodiment of this disclosure. For details not disclosed in the audio acquisition device positioning apparatus, reference may be made to the foregoing description of the audio acquisition device positioning method provided in this embodiment of this disclosure.

Figure 9:
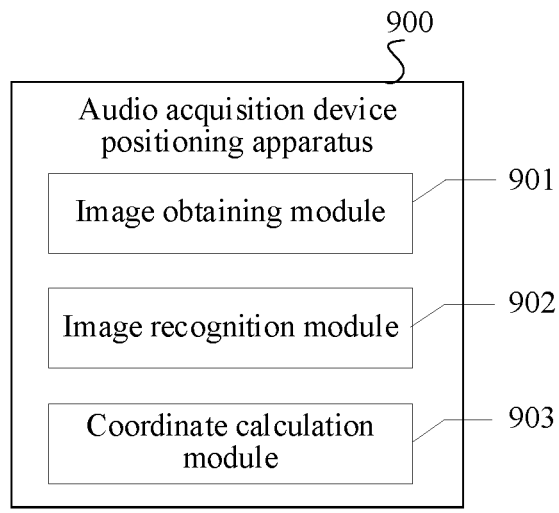
FIG. 9 shows a schematic architectural diagram of an audio acquisition device positioning apparatus according to an embodiment of this disclosure.

FIG. 9 schematically shows an architectural diagram of an audio acquisition device positioning apparatus according to an embodiment of this disclosure.

Referring to FIG. 9, an audio acquisition device positioning apparatus 900 includes: an image obtaining module 901, an image recognition module 902, and a coordinate calculation module 903. One or more of modules of the apparatus can be implemented by processing circuitry, software, or a combination thereof, for example.

The image obtaining module 901 is configured to obtain a to-be-detected image. The image recognition module 902 is configured to recognize an audio acquisition device in the to-be-detected image, to obtain first coordinate data of the audio acquisition device. The coordinate calculation module 903 is configured to determine displacement data according to the first coordinate data and historical coordinate data of the audio acquisition device, and determine coordinates of the audio acquisition device according to the displacement data.

In some embodiments, the image recognition module 902 is configured to recognize the to-be-detected image, to obtain a recognition target conforming to the audio acquisition device; and determine, when a recognition target is recognized, coordinate data corresponding to the recognition target as the first coordinate data of the audio acquisition device.

In some embodiments, the image recognition module 902 is configured to perform edge detection on the to-be-detected image when a plurality of recognition targets are recognized, to determine a recognition target disposed on a support apparatus among the plurality of recognition targets; and determine coordinate data corresponding to the recognition target disposed on the support apparatus as the first coordinate data of the audio acquisition device.

In some embodiments, the coordinate calculation module 903 is configured to perform weighted average processing on all historical coordinate data of the audio acquisition device in a preset historical coordinate database, to obtain first historical coordinate data; and compare the first coordinate data of the audio acquisition device and the first historical coordinate data, to obtain the displacement data.

In some embodiments, the coordinate calculation module 903 is configured to save the first coordinate data of the audio acquisition device to the historical coordinate database as historical coordinate data in the historical coordinate database when the displacement data is less than a first threshold; perform weighted average processing on all the historical coordinate data in the historical coordinate database, to obtain second coordinate data; and determine the second coordinate data as coordinates of the audio acquisition device.

In some embodiments, the to-be-detected image is an $n^{th}$ frame of to-be-detected image; and the coordinate calculation module 903 is configured to determine the first historical coordinate data as the coordinates of the audio acquisition device in the $n^{th}$ frame of to-be-detected image when that the displacement data is greater than or equal to the first threshold, n being a positive integer.

In some embodiments, the coordinate calculation module 903 is configured to save first coordinate data of the $n^{th}$ frame of to-be-detected image to a preset mobile cache coordinate database as mobile cache coordinate data; compare first coordinate data in an $(n+1)^{th}$ frame of to-be-detected image with the mobile cache coordinate data, or compare the first coordinate data in the $(n+1)^{th}$ frame of to-be-detected image with the first historical coordinate data; and determine coordinates of the audio acquisition device in the (n+1)th frame of to-be-detected image according to a result of the comparison.

In some embodiments, the coordinate calculation module 903 is configured to determine position deviation data between the first coordinate data in the $(n+1)^{th}$ frame of to-be-detected image and the mobile cache coordinate data; clear the historical coordinate database when the position deviation data is less than a second threshold; save the mobile cache coordinate data and the first coordinate data in the $(n+1)^{th}$ frame of to-be-detected image to the historical coordinate database as historical coordinate data in the historical coordinate database; perform weighted average processing on all the historical coordinate data in the historical coordinate database, to obtain third coordinate data;

and determine the third coordinate data as the coordinates of the audio acquisition device in the $(n+1)^{th}$ frame of to-be-detected image.

In some embodiments, the coordinate calculation module 903 is configured to determine position deviation data between the first coordinate data in the $(n+1)^{th}$ frame of to-be-detected image and the mobile cache coordinate data; compare the first coordinate data in the $(n+1)^{th}$ frame of to-be-detected image with the first historical coordinate data to obtain displacement data when the position deviation data is greater than or equal to the second threshold; save the first coordinate data in the $(n+1)^{th}$ frame of to-be-detected image to the historical coordinate database as historical coordinate data in the historical coordinate database when the displacement data corresponding to the $(n+1)^{th}$ frame of to-be-detected image is less than the first threshold; perform weighted average processing on all the historical coordinate data in the historical coordinate database, to obtain fourth coordinate data; determine the fourth coordinate data as the coordinates of the audio acquisition device in the $(n+1)^{th}$ frame of to-be-detected image; and clear the mobile cache coordinate database.

In some embodiments, the coordinate calculation module 903 is configured to compare the first coordinate data in the $(n+1)^{th}$ frame of to-be-detected image with the first historical coordinate data, to obtain displacement data; determine the position deviation data between the first coordinate data in the $(n+1)^{th}$ frame of to-be-detected image and the mobile cache coordinate data when the displacement data corresponding to the $(n+1)^{th}$ frame of to-be-detected image is greater than or equal to the first threshold; clear the historical coordinate database when the position deviation data is less than a second threshold; save the mobile cache coordinate data and the first coordinate data in the $(n+1)^{th}$ frame of to-be-detected image to the historical coordinate database as historical coordinate data in the historical coordinate database; perform weighted average processing on all the historical coordinate data in the historical coordinate database, to obtain third coordinate data; and determine the third coordinate data as the coordinates of the audio acquisition device in the $(n+1)^{th}$ frame of to-be-detected image.

In some embodiments, the coordinate calculation module 903 is configured to compare the first coordinate data in the $(n+1)^{th}$ frame of to-be-detected image with the first historical coordinate data, to obtain displacement data; save the first coordinate data in the $(n+1)^{th}$ frame of to-be-detected image to the historical coordinate database as historical coordinate data in the historical coordinate database when the displacement data corresponding to the $(n+1)^{th}$ frame of to-be-detected image is less than the first threshold; perform weighted average processing on all the historical coordinate data in the historical coordinate database, to obtain fourth coordinate data; determine the fourth coordinate data as the coordinates of the audio acquisition device in the $(n+1)^{th}$ frame of to-be-detected image; and clear the mobile cache coordinate database.

In some embodiments, the audio acquisition device positioning apparatus 900 further includes a first processing module, configured to perform weighted average processing on all historical coordinate data of the audio acquisition device in a preset historical coordinate database to obtain fifth coordinate data when the audio acquisition device is not recognized in k consecutive frames of the to-be-detected image and k is less than a third threshold; and determine the fifth coordinate data as the coordinates of the audio acquisition device in the to-be-detected image, k being a positive integer.

In some embodiments, the audio acquisition device positioning apparatus 900 further includes a second processing module, configured to generate alarm information indicating that the audio acquisition device does not exist in the to-be-detected image when the audio acquisition device is not recognized in j consecutive frames of the to-be-detected image and j is greater than or equal to a third threshold, j being a positive integer.

In some embodiments, the image recognition module 902 is configured to perform convolution processing on a to-be-detected image to obtain a feature map; classify feature points in the feature map to determine a region proposal; perform pooling processing on the region proposal to obtain a feature map proposal; and perform fully connected processing on the feature map proposal, to obtain first coordinate data of an audio acquisition device.

Figure 10:
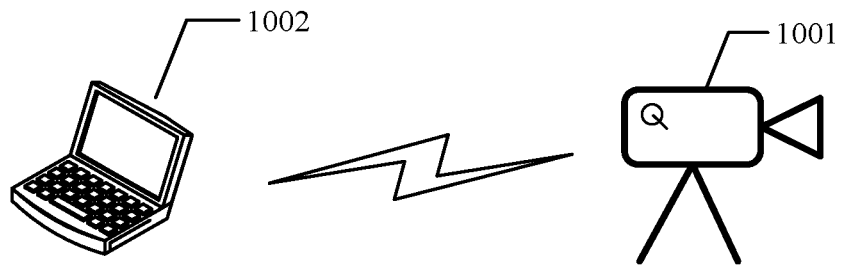
FIG. 10 shows a schematic architectural diagram of a speaker recognition system according to an embodiment of this disclosure.

FIG. 10 schematically shows an architectural diagram of a speaker recognition system according to an embodiment of this disclosure. Referring to FIG. 10, the recognition system provided in this embodiment of this disclosure includes a photographing device 1001 and an electronic device 1002.

The photographing device 1001 can be any image capture device that is configured to obtain a to-be-detected image. The electronic device 1002 is connected to the photographing device, and the electronic device includes a storage apparatus and a processor, the storage apparatus being configured to store one or more programs, and the one or more programs, when executed by the processor, causing the processor to implement the speaker recognition method according to an embodiment of this disclosure, to process the to-be-detected image to obtain a speaker.

Figure 11:
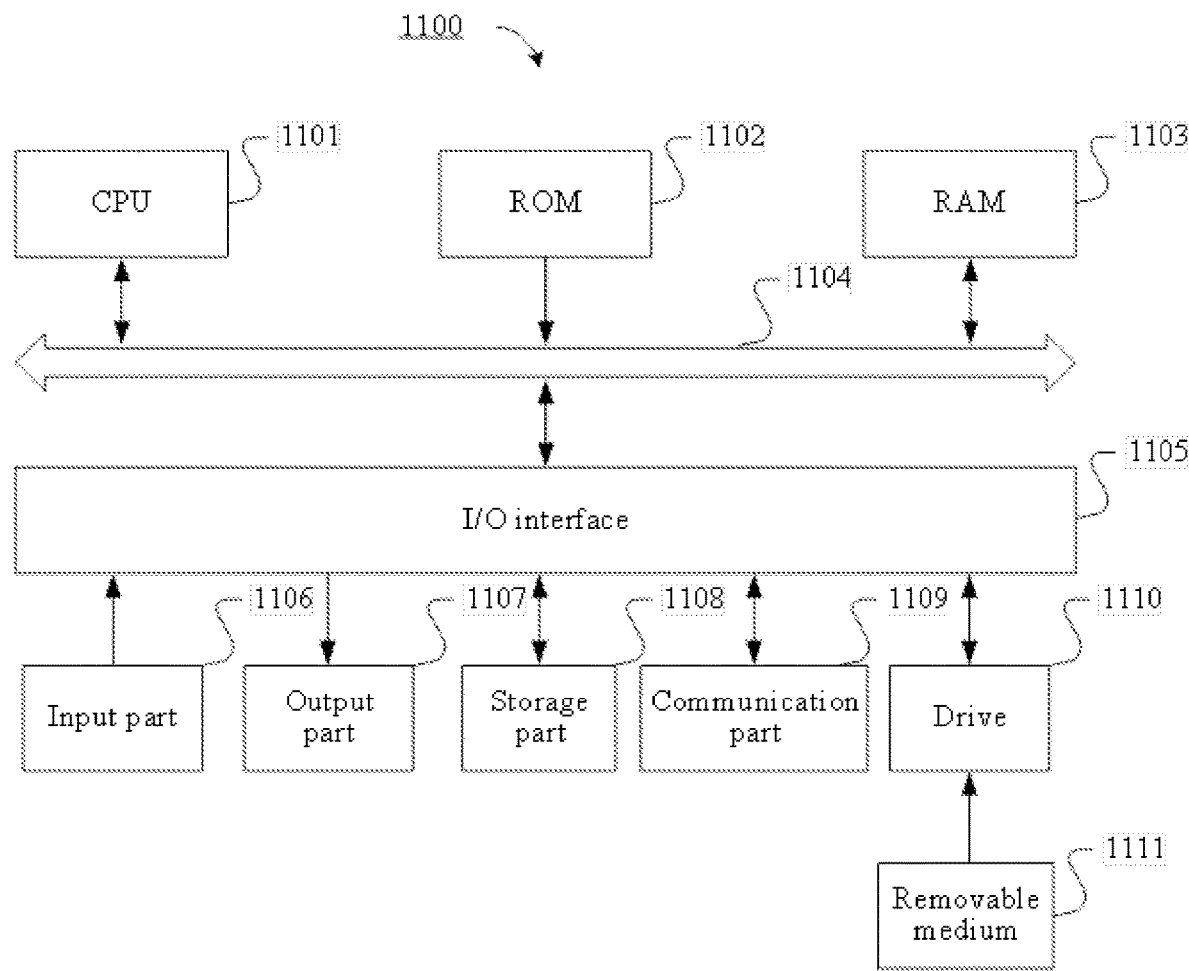
FIG. 11 shows a schematic structural diagram of a computer system adapted to implement an electronic device according to an embodiment of this disclosure.

FIG. 11 shows a schematic structural diagram of a computer system adapted to implement an electronic device according to an embodiment of this disclosure.

A computer system 1100 of the electronic device shown in FIG. 11 is merely an example, and does not constitute any limitation on functions and use ranges of the embodiments of this disclosure.

As shown in FIG. 11, the computer system 1100 includes a central processing unit (CPU) 1101, which may perform various proper actions and processing based on a program stored in a read-only memory (ROM) 1102 or a program loaded from a storage part 1108 into a random access memory (RAM) 1103. The RAM 1103 further stores various programs and data required for system operations. The CPU 1101, the ROM 1102, and the RAM 1103 are connected to each other through a bus 1104. An input/output (I/O) interface 1105 is also connected to the bus 1104.

The following components are connected to the I/O interface 1105: an input part 1106 including a keyboard, a mouse, or the like, an output part 1107 including a cathode ray tube (CRT), a liquid crystal display (LCD), a speaker, or the like, a storage part 1108 including a hard disk, or the like, and a communication part 1109 including a network interface card such as a local area network (LAN) card or a modem. The communication part 1109 performs communication processing over a network such as the Internet. A drive 1110 is also connected to the I/O interface 1105 as required. A removable medium 1111, such as a magnetic disk, an optical disc, a magneto-optical disk, or a semiconductor memory, is installed on the drive 1110 as required, so that a computer program read from the removable medium is installed into the storage part 1108 as required.

Particularly, according to an embodiment of this disclosure, the processes described in the following by referring to the flowcharts may be implemented as computer software programs. For example, this embodiment of this disclosure includes a computer program product, the computer program product includes a computer program carried on a computer-readable medium, and the computer program includes program code configured to perform the methods shown in the flowcharts. In such an embodiment, the computer program may be downloaded and installed from a network through the communication part 1109, and/or installed from the removable medium 1111. When the computer program is executed by the CPU 1101, the various functions defined in the system of this embodiment of this disclosure are executed.

The computer-readable medium shown in the embodiments of this disclosure may be a computer-readable signal medium or a computer-readable storage medium (e.g., a non-transitory computer-readable storage medium) or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In the embodiments of this disclosure, the computer-readable storage medium may be any tangible medium including or storing a program, and the program may be used by or in combination with an instruction execution system, apparatus or component. In the embodiments of this disclosure, the computer-readable signal medium may include a data signal propagated in a baseband or as a part of a carrier, and stores computer-readable program code. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wired medium, or the like, or any suitable combination thereof.

The flowcharts and block diagrams in the accompanying drawings illustrate possible system architectures, functions, and operations that may be implemented by a system, a method, and a computer program product according to various embodiments of this disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units described in the embodiments of this disclosure may be implemented in a software manner, or may be implemented in a hardware manner such as using processing circuitry, and the unit described can also be set in a processor. Names of the units do not constitute a limitation on the units in a specific case.

According to another aspect, an embodiment of this disclosure further provides a computer-readable medium, such as a non-transitory computer-readable storage medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although several modules or units of a device for action execution are mentioned in the foregoing detailed descriptions, the division is not mandatory. Actually, according to the implementations of this disclosure, the features and functions of two or more modules or units described above may be specified in one module or unit. Conversely, features and functions of one module or unit described above may be further divided into a plurality of modules or units to be specified.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this disclosure.

A person skilled in the art would understand other variations and implementation solutions of this disclosure are possible after considering the disclosure and practicing this disclosure that is disclosed herein. This disclosure is intended to cover any variations, uses or adaptive changes of this disclosure. Such variations, uses or adaptive changes follow the general principles of this disclosure, and include well-known knowledge and related technical means in the art that are not disclosed in this disclosure.

This disclosure is not limited to the structures that are described above and that are shown in the accompanying drawings, and modifications and changes may be made without departing from the scope of this disclosure.

Industrial Practicability

In the embodiments of this disclosure, the first coordinate data of the audio acquisition device is obtained by recognizing the audio acquisition device in the to-be-detected image, the displacement data is determined according to the first coordinate data and the historical coordinate data of the audio acquisition device, and then the coordinates of the audio acquisition device are determined according to the displacement data. Therefore, the correctness of the first coordinate data can be determined with reference to the historical coordinate data, and the coordinate data can be optimized, to improve the accuracy of the obtained coordinates, which may be applied to various application scenarios of audio acquisition device positioning.

What is claimed is:

1. An audio acquisition device positioning method, comprising:
    obtaining a first image that includes an audio acquisition device;
    identifying the audio acquisition device in the first image;
    obtaining first coordinate data of the identified audio acquisition device in the first image;
    determining first displacement data according to a distance between coordinates indicated by the first coordinate data and coordinates indicated by historical coordinate data of the audio acquisition device stored in a historical coordinate database;
    determining whether to store the first coordinate data in the historical coordinate database or a cache coordinate database according to a comparison of the first displacement data with a first threshold; and
    determining, by processing circuitry, whether to copy data from the cache coordinate database to the historical coordinate database according to a comparison of the first coordinate data with second coordinate data of the audio acquisition device identified in a second image following the first image.

2. The audio acquisition device positioning method according to claim 1, wherein
    the identifying includes identifying a recognition target conforming to the audio acquisition device in the first image; and
    the method further comprises determining, when the recognition target is identified, first coordinates of the audio acquisition device in the first image based on target coordinate data corresponding to the recognition target.

3. The audio acquisition device positioning method according to claim 2, wherein the determining the first coordinates comprises:
    performing edge detection on the first image when a plurality of recognition targets are identified, to determine the recognition target disposed on a stand from among the plurality of recognition targets; and
    determining the first coordinates of the audio acquisition device based on the target coordinate data corresponding to the recognition target disposed on the stand.

4. The audio acquisition device positioning method according to claim 1, wherein the determining the first displacement data comprises:
    obtaining first historical coordinate data based on a weighted average processing performed on the historical coordinate data of the audio acquisition device in the historical coordinate database; and
    obtaining the first displacement data based on a comparison of the coordinates indicated by the first coordinate data of the audio acquisition device and coordinates indicated by the first historical coordinate data.

5. The audio acquisition device positioning method according to claim 4, further comprising:
    storing historical coordinate data corresponding to the first coordinate data of the audio acquisition device in the historical coordinate database when the first displacement data is less than the first threshold;
    obtaining second historical coordinate data based on a weighted average processing performed on the historical coordinate data in the historical coordinate database; and
    determining the first coordinates of the audio acquisition device based on the second historical coordinate data.

6. The audio acquisition device positioning method according to claim 4, wherein
    the first image is an $n^{th}$ image of a plurality of images; and
    the method further comprises determining first coordinates of the audio acquisition device in the first image based on the first historical coordinate data when the first displacement data is greater than or equal to the first threshold, n being a positive integer.

7. The audio acquisition device positioning method according to claim 6, further comprising:
    storing cache coordinate data corresponding to the first coordinate data of the first image in the cache coordinate database;
    comparing the second coordinate data in the second image that is obtained after the first image with one of the cache coordinate data and the first historical coordinate data; and
    determining second coordinates of the audio acquisition device in the second image based on the comparison of the second coordinate data in the second image and the one of the cache coordinate data and the first historical coordinate data.

8. The audio acquisition device positioning method according to claim 7, wherein
    the comparing the second coordinate data in the second image with the cache coordinate data includes determining position deviation data between the second coordinate data in the second image and the cache coordinate data; and
    the determining the second coordinates of the audio acquisition device in the second image includes:
        clearing the historical coordinate database when the position deviation data is less than a second threshold;
        storing historical coordinate data corresponding to the cache coordinate data and the second coordinate data in the second image in the historical coordinate database;
        obtaining third coordinate data based on a weighted average processing performed on the historical coordinate data stored in the historical coordinate database; and
        determining the second coordinates of the audio acquisition device in the second image based on the third coordinate data.

9. The audio acquisition device positioning method according to claim 7, wherein
    the comparing the second coordinate data in the second image with the cache coordinate data includes determining position deviation data between the second coordinate data in the second image and the cache coordinate data; and
    the determining the second coordinates of the audio acquisition device in the second image includes:
        comparing the second coordinate data in the second image with the first historical coordinate data to obtain second displacement data when the position deviation data is greater than or equal to a second threshold;
        storing historical coordinate data corresponding to the second coordinate data in the second image in the historical coordinate database when the second displacement data corresponding to the second image is less than the first threshold;

obtaining fourth coordinate data based on a weighted average processing performed on the historical coordinate data stored in the historical coordinate database; and determining the second coordinates of the audio acquisition device in the second image based on the fourth coordinate data.

10. The audio acquisition device positioning method according to claim 9, further comprising:
clearing the cache coordinate database.

11. The audio acquisition device positioning method according to claim 7, wherein
the comparing the second coordinate data in the second image with the first historical coordinate data includes comparing the second coordinate data in the second image with the first historical coordinate data, to obtain second displacement data; and
the determining the second coordinates of the audio acquisition device in the second image includes:
determining position deviation data between the second coordinate data in the second image and the cache coordinate data when the second displacement data corresponding to the second image is greater than or equal to the first threshold;
clearing the historical coordinate database when the position deviation data is less than a second threshold;
storing historical coordinate data corresponding to the cache coordinate data and the second coordinate data in the second image in the historical coordinate database;
obtaining third coordinate data based on a weighted average processing performed on the historical coordinate data stored in the historical coordinate database; and
determining the second coordinates of the audio acquisition device in the second image based on the third coordinate data.

12. The audio acquisition device positioning method according to claim 7, wherein
the comparing the second coordinate data in the second image includes comparing the second coordinate data in the second image with the first historical coordinate data, to obtain second displacement data; and
the determining the second coordinates of the audio acquisition device in the second image includes:
storing historical coordinate data corresponding to the second coordinate data in the second image in the historical coordinate database when the second displacement data corresponding to the second image is less than the first threshold;
obtaining fourth coordinate data based a weighted average processing performed on the historical coordinate data stored in the historical coordinate database; and
determining the second coordinates of the audio acquisition device in the second image based on the fourth coordinate data.

13. The audio acquisition device positioning method according to claim 12, further comprising:
clearing the cache coordinate database.

14. The audio acquisition device positioning method according to claim 1, further comprising:
performing a weighted average processing on the historical coordinate data of the audio acquisition device in the historical coordinate database to obtain fifth coordinate data when the audio acquisition device is not recognized in k consecutive images and k is less than a third threshold; and
determining first coordinates of the audio acquisition device in the first image based on the fifth coordinate data, k being a positive integer.

15. The audio acquisition device positioning method according to claim 1, further comprising:
generating notification information indicating that the audio acquisition device is not present when the audio acquisition device is not recognized in j consecutive images and j is greater than or equal to a third threshold, j being a positive integer.

16. An audio acquisition device positioning apparatus, comprising:
processing circuitry configured to:
obtain a first image that includes an audio acquisition device;
identify the audio acquisition device in the first image;
obtain first coordinate data of the identified audio acquisition device in the first image;
determine first displacement data according to a distance between coordinates indicated by the first coordinate data and coordinates indicated by historical coordinate data of the audio acquisition device stored in a historical coordinate database;
determine whether to store the first coordinate data in the historical coordinate database or a cache coordinate database according to a comparison of the first displacement data with a first threshold; and
determine whether to copy data from the cache coordinate database to the historical coordinate database according to a comparison of the first coordinate data with second coordinate data of the audio acquisition device identified in a second image following the first image.

17. The audio acquisition device positioning apparatus according to claim 16, wherein the processing circuitry is configured to:
identify a recognition target conforming to the audio acquisition device in the first image; and
determine, when the recognition target is identified, first coordinates of the audio acquisition device in the first image based on target coordinate data corresponding to the recognition target.

18. A speaker recognition method, comprising:
obtaining an image from an image capture device;
performing face recognition processing on the image to obtain coordinates of at least one face in the image;
identifying an audio acquisition device in the image;
determining first displacement data according to a distance between coordinates of the audio acquisition device in the image and historical coordinates of the audio acquisition device stored in a historical coordinate database;
determining whether to store the first coordinate data in the historical coordinate database or a cache coordinate database according to a comparison of the first displacement data with a first threshold;
determining whether to copy data from the cache coordinate database to the historical coordinate database according to a comparison of the first coordinate data with second coordinate data of the audio acquisition device identified in a second image following the first image;

determining first coordinates of the audio acquisition device according to the comparison of the first displacement data with the first threshold;

determining a distance between the first coordinates of the audio acquisition device and the coordinates of each of the at least one face; and determining, by processing circuitry, an object corresponding to the coordinates of a face of the at least one face with the smallest distance as a speaker.

19. A speaker recognition system, comprising:

the audio acquisition device positioning apparatus according to claim 16; and an image capture device that includes an imaging sensor configured to obtain the first image.

20. A non-transitory computer-readable storage medium storing instructions which when executed by a processor, cause the processor to perform:

obtaining a first image that includes an audio acquisition device;

identifying the audio acquisition device in the first image;

obtaining first coordinate data of the identified audio acquisition device in the first image;

determining first displacement data according to a distance between coordinates indicated by the first coordinate data and coordinates indicated by historical coordinate data of the audio acquisition device stored in a historical coordinate database;

determining whether to store the first coordinate data in the historical coordinate database or a cache coordinate database according to a comparison of the first displacement data with a first threshold; and determining whether to copy data from the cache coordinate database to the historical coordinate database according to a comparison of the first coordinate data with second coordinate data of the audio acquisition device identified in a second image following the first image.

* * * * *